(12) United States Patent
Yang et al.

(10) Patent No.: US 9,751,160 B2
(45) Date of Patent: Sep. 5, 2017

(54) WELDING DEVICE

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventors: Ming-Lu Yang, New Taipei (TW); Wei-Zhong Dai, Jiashan (CN); Chao Shen, Jiashan (CN)

(73) Assignees: FU DING ELECTRONICAL TECHNOLOGY (JIASHAN) CO.,LTD., Jiashan (CN); HON HAI PRECISION INDUSTRY CO., LTD., New Taipei (TW)

( * ) Notice: Subject to any disclaimer, the term of this patent is extended or adjusted under 35 U.S.C. 154(b) by 512 days.

(21) Appl. No.: 14/508,726

(22) Filed: Oct. 7, 2014

(65) Prior Publication Data
US 2015/0114569 A1    Apr. 30, 2015

(30) Foreign Application Priority Data
Oct. 28, 2013    (CN) .......................... 2013 1 0513165

(51) Int. Cl.
*B23K 37/02*    (2006.01)
*B23K 101/30*    (2006.01)

(52) U.S. Cl.
CPC .......... *B23K 37/02* (2013.01); *B23K 2201/30* (2013.01)

(58) Field of Classification Search
CPC .............................. B23K 37/02; B23K 201/30
See application file for complete search history.

(56) References Cited

U.S. PATENT DOCUMENTS

| 4,878,985 | A | * | 11/1989 | Thomsen | B29C 53/40 156/137 |
| 5,328,083 | A | * | 7/1994 | Peru | B23K 26/0838 219/121.63 |
| 9,397,067 | B2 | * | 7/2016 | Wang | H01L 24/80 |

FOREIGN PATENT DOCUMENTS

CN    101870034 A    10/2010

* cited by examiner

*Primary Examiner* — Jeff Aftergut
(74) *Attorney, Agent, or Firm* — Steven Reiss

(57) ABSTRACT

A welding device for welding and transmitting belts includes a feeding mechanism, a positioning mechanism, a welding mechanism, and a control unit. The feeding mechanism is used for storing and transmitting the belts to the positioning mechanism. The positioning mechanism receives and positions the belts. The welding mechanism includes a cylinder assembly and a welding assembly connected to the cylinder assembly driven by the cylinder assembly in a vertical direction and in a horizontal direction, whereby the welding assembly is horizontally and vertically moved to the positioning mechanism. The control unit controls an operation of the feeding mechanism, the positioning mechanism, and the welding mechanism.

11 Claims, 5 Drawing Sheets

WELDING DEVICE

FIELD

The subject matter herein generally relates to continuous welding.

BACKGROUND

In industrial production, the work pieces made from several materials in a manufacturing process can be involved in a welding process, which is a machining process able to provide a permanent connection between the work pieces using electricity or heating, for example, before an overall plating process.

BRIEF DESCRIPTION OF THE DRAWINGS

Implementations of the present technology will now be described, by way of example only, with reference to the attached figures.

DETAILED DESCRIPTION

Figure 1:
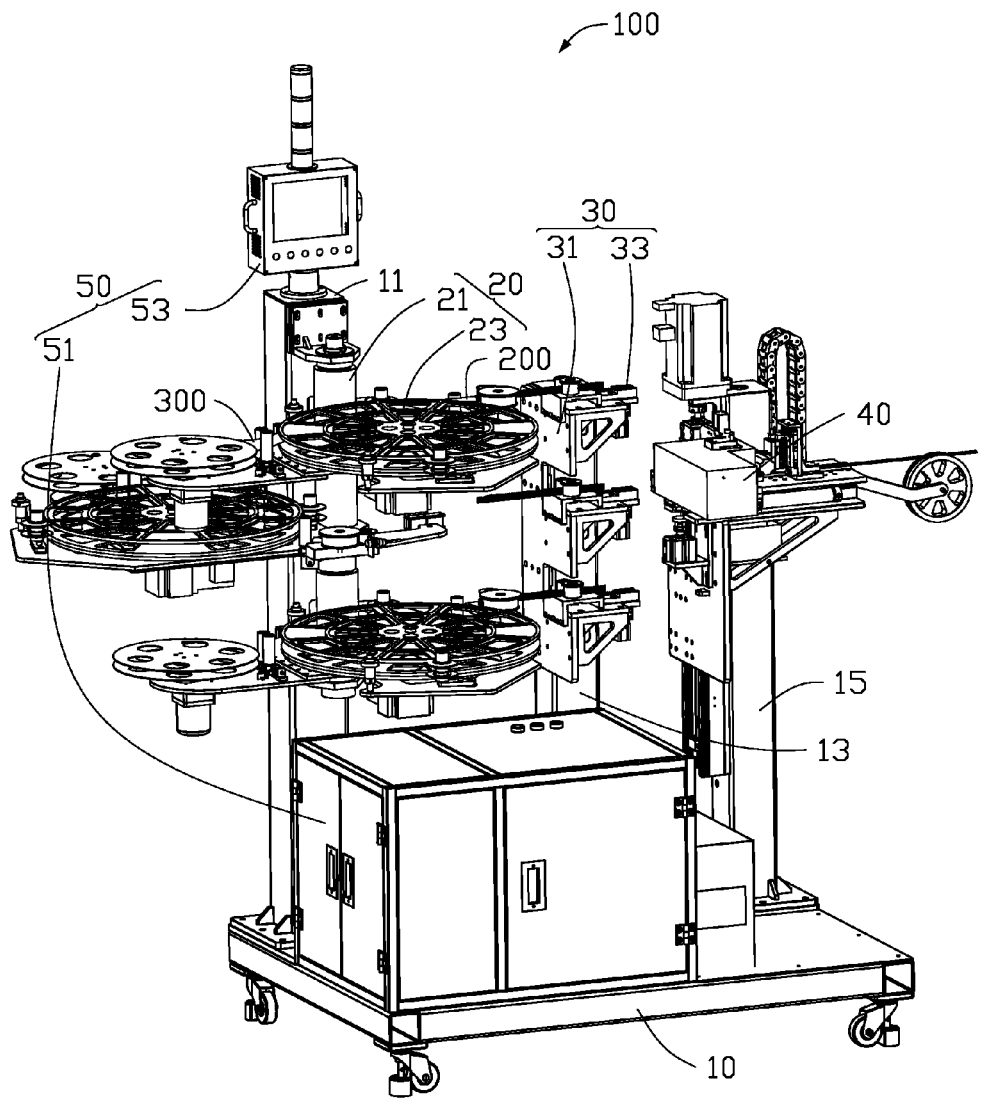
FIG. 1 is an isometric view of a welding device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "comprising", when utilized, means "including, but not necessarily limited to"; it specifically indicates open-ended inclusion or membership in the so-described combination, group, series and the like.

The present disclosure is described in relation to a welding device.

FIG. 1 illustrates that a welding device 100 can include a bracket 10, a feeding mechanism 20, a positioning mechanism 30, a welding mechanism 40, and a control unit 50. The welding device 100 can weld a plurality of belts and transmit the welded belts to a next manufacturing process. The feeding mechanism 20 and welding mechanism 40 can be positioned on the bracket 10 spaced apart from each other. The positioning mechanism 30 can be positioned between the feeding mechanism 20 and welding mechanism 40. The control unit 50 can be electrically connected to the feeding mechanism 20, the positioning mechanism 30, and the welding mechanism 40. The control unit 50 can control an operation of the feeding mechanism 20, the positioning mechanism 30, and the welding mechanism 40. Furthermore, the belts, such as a first feeding belt 200 and a second feeding belt 300 can be positioned on the welding device 100 to be welded and transmitted to the next manufacturing process by the welding device 100.

The bracket 10 can include a first supporting element 11, a second supporting element 13, and a third supporting element 15. The first supporting element 11, the second supporting element 13, and the third supporting element 15 can be vertically positioned relative to the ground and parallel with each other. The first supporting element 11, the second supporting element 13, and the third supporting element 15 are configured to house and support the feeding mechanism 20, the positioning mechanism 30, the welding mechanism 40, and the control unit 50.

The feeding mechanism 20 can be installed on the first supporting element 11 adjacent to the positioning mechanism 30. The feeding mechanism 20 can be configured to store and transmit the belts to be welded to the positioning mechanism 30. The feeding mechanism 20 can include a fixing column 21 and three feeding assemblies 23. The three feeding assemblies 23 can be positioned on the fixing column 21 and spaced apart from each other. The three feeding assemblies 23 can include a feeding assembly 23 furthest from the bracket 10, a feeding assembly 23 closest to the bracket 10, and a feeding assembly 23 between the two, which are vertically staggered.

The positioning mechanism 30 can position the first feeding belt 200 and second feeding belt 300. The positioning mechanism 30 can be installed on the second supporting element 13 and include a fixing plate 31 and three positioning assemblies 33. The fixing plate 31 can be vertically positioned on the bracket 10, and the three positioning assemblies 33 can be installed on the fixing plate 31, and stacked evenly up and down. The three positioning assemblies 33 can include a positioning assembly 33 furthest from the bracket 10, a positioning assembly 33 closest to the bracket 10, and a positioning assembly 33 between the other two. Each positioning assembly 33 can be positioned coplanar with each feeding assembly 23.

The welding mechanism 40 can be configured to weld the first feeding belt 200 and the second feeding belt 300, and to transmit the welded belts to a next manufacturing process.

The control unit 50 can include an electric control module 51 and a control panel 53. The electric control module 51 can be positioned on the bracket 10 and include a plurality of control circuits to control the operation of the feeding mechanism 20, the positioning mechanism 30, and the welding mechanism 40. In at least one embodiment, the electric control module 51 can employ a control method, for example, a method of micro programmed control unit (MCU) or a method of microcomputer control. The control panel 53 can be electrically connected to the electric control module 51 and include a plurality of buttons for a plurality of functions of the electric control module 51, to control the movement of the welding device 100. When the control unit 50 is activated, the welding device 100 can begin to work and the feeding mechanism 20 can transmit the first feeding belt 200 and second feeding belt 300 to the positioning mechanism 30.

Figure 2:
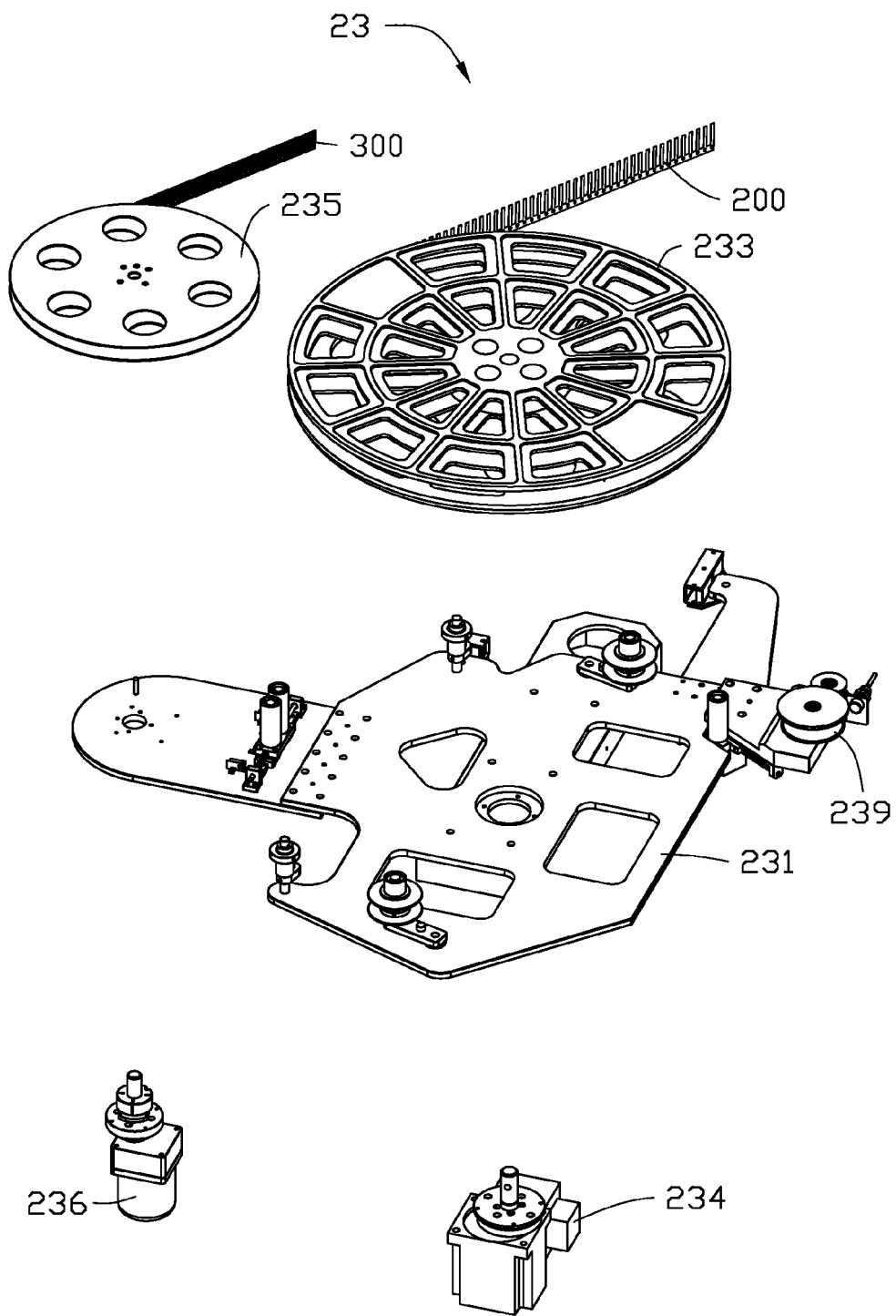
FIG. 2 is an exploded, isometric view of a feeding assembly for the welding device shown in FIG. 1.

FIG. 2 illustrates that the feeding assembly 23 can include a supporting element 231, a first disk 233, a first driver 234; a second disk 235, a second driver 236, and a guiding element 239. The supporting element 231 can be secured on the fixing column 21, whereby the feeding assembly 23 can communicate with the fixing column 21 (as shown in FIG. 1). The first disk 233 and second disk 235 can be positioned on the two sides of the supporting element 231 and spaced apart from each other. The first feeding belt 200 can be coiled on the first disk 233, and the second feeding belt 300 can be coiled on the second disk 235. The first driver 234 can be positioned under the first disk 233, and the second driver 236 can be positioned under the second disk 235. The first driver 234 can be configured to drive the first disk 233 to rotate and transmit the first feeding belt 200 to the positioning mechanism 30 (as shown in FIG. 1). The second driver 236 can be configured to drive the second disk 235 to rotate and transmit the second feeding belt 300 to the positioning mechanism 30 (as shown in FIG. 1). The guiding element 239 can be positioned on a rim of the supporting element 231 and adjacent to the first disk 233. The guiding element 239 can be configured to adjust the motion of the first feeding belt 200 and second feeding belt 300. The first feeding belt 200 and second feeding belt 300 transmitted from the feeding mechanism 20 can be further secured by the positioning mechanism 30 (as shown in FIG. 1).

Figure 3:
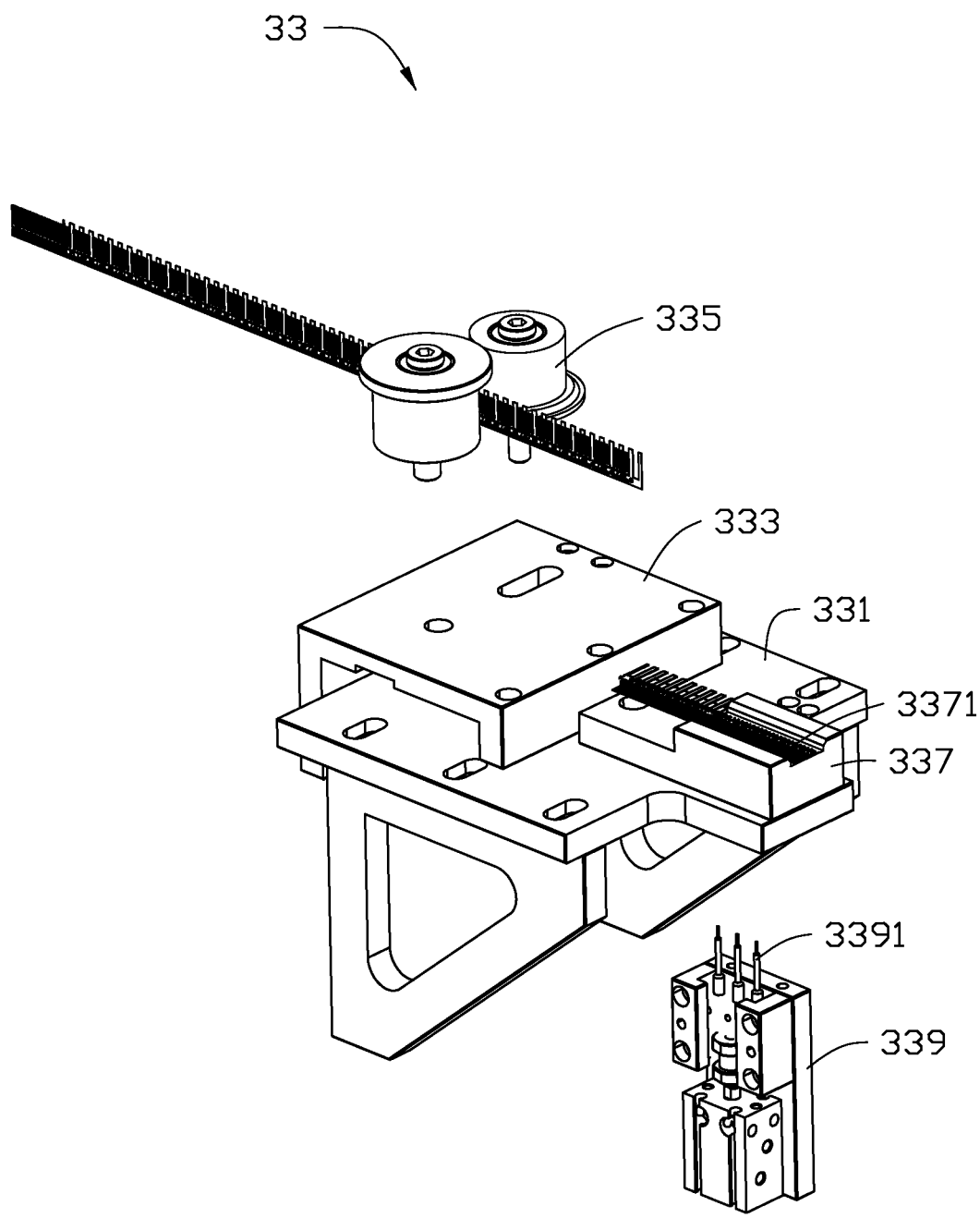
FIG. 3 is an exploded, isometric view of a positioning assembly for the welding device shown in FIG. 1.

FIG. 3 illustrates that the positioning assembly 33 can include an assembly plate 331, a supporting block 333, a positioning element 335; a positioning block 337, and a pushing element 339. The assembly plate 331 can be fixed on the fixing plate 31(as shown in FIG. 1). The supporting block 333 and positioning block 337 can be fixed on the assembly plate 331, and the supporting block 333 can be adjacent to the positioning block 337. The positioning element 335 can be installed on the supporting block 333 facing the guiding element 239 to receive the first feeding belt 200 and second feeding belt 300 adjusted by the guiding element 239 (as shown in FIGS. 1-2).

The positioning block 337 can include a receiving groove 3371 configured to receiving the first feeding belt 200 and second feeding belt 300 (as shown in FIG. 1). The pushing element 339 can be installed under the positioning block 337. The pushing element 339 can include three pinning elements 3391 configured to mesh with the first feeding belt 200 and the second feeding belt 300 (as shown in FIGS. 1-2). In at least one embodiment, the first feeding belt 200 and the second feeding belt 300 can each define a plurality of holes, and the three pinning elements 3391 can pass through the plurality of holes to mesh with and engage the first feeding belt 200 and the second feeding belt 300 (as shown in FIGS. 1-2).

When the first feeding belt 200 and the second feeding belt 300 are transmitted to the positioning mechanism 30 (as shown in FIG. 1), the pushing element 339 can push the pinning elements 3391 to engage the belts received in the receiving groove 3371. After welding, the pushing element 339 can drive the pinning elements 3391 away from the positioning block 337.

Figure 4:
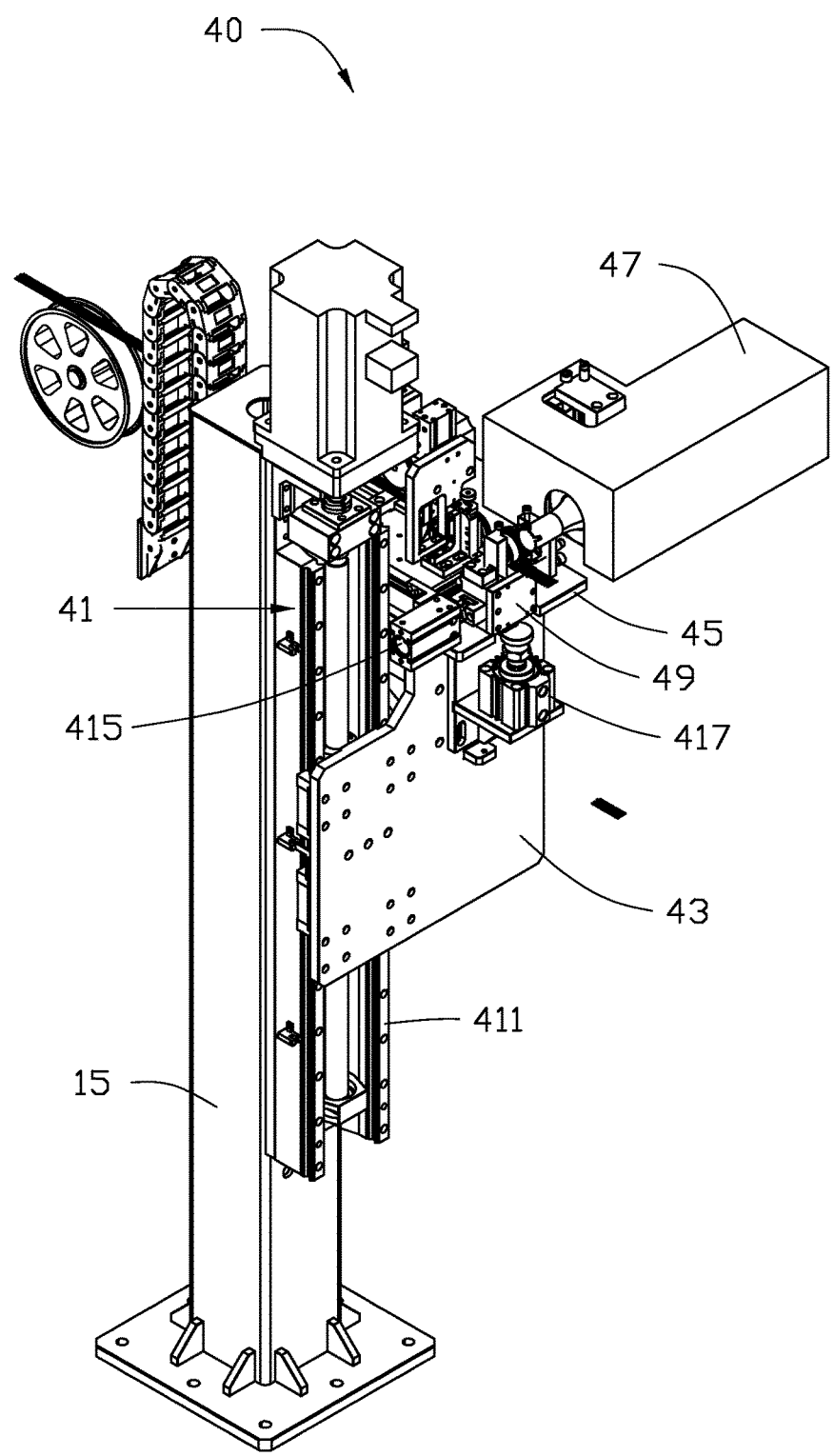
FIG. 4 is an isometric view of a welding mechanism for the welding device shown in FIG. 1.
Figure 5:
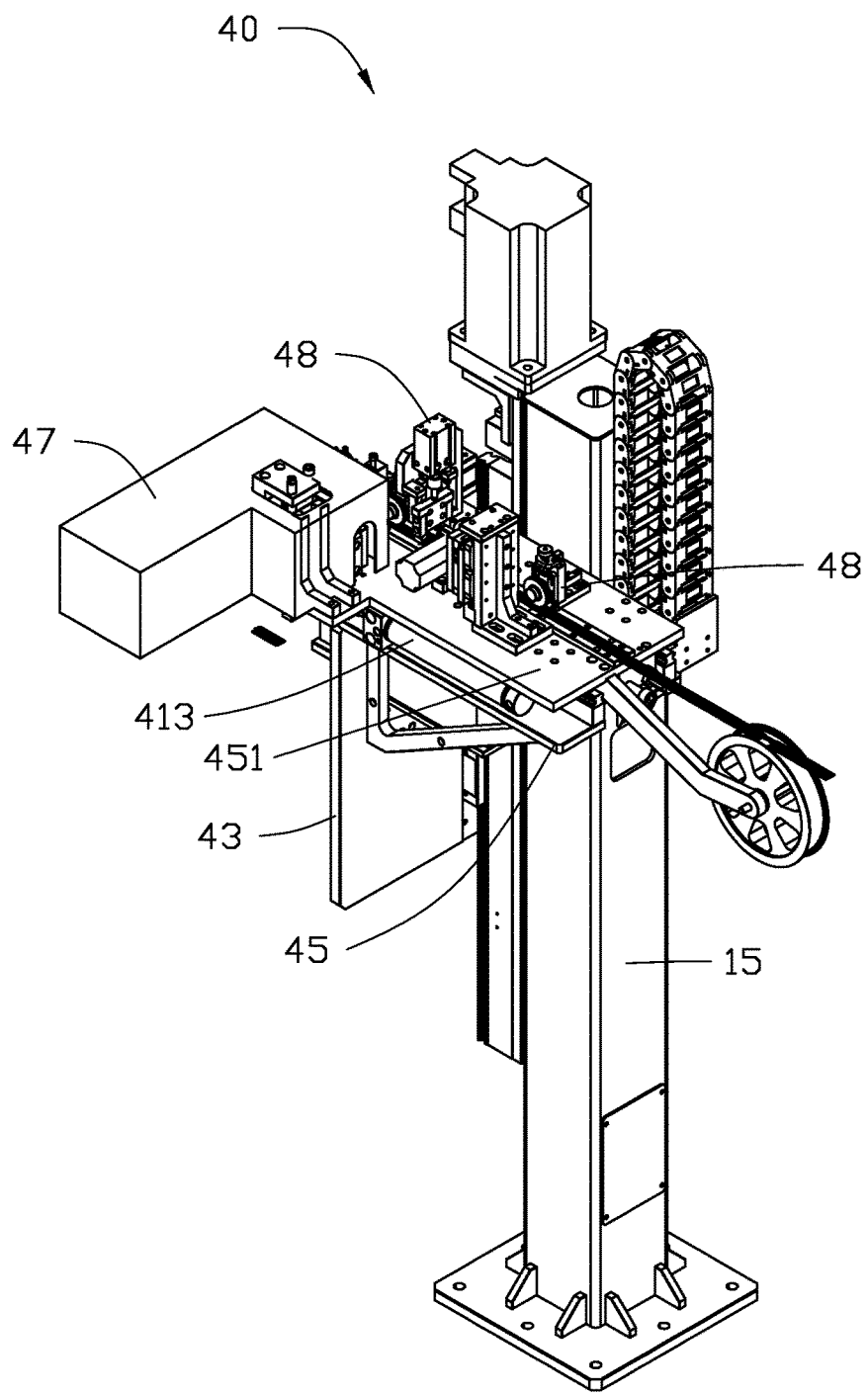
FIG. 5 is an isometric view of the welding mechanism of FIG. 4 from another angle.

FIGS. 4-5 illustrates that the welding mechanism 40 can include a cylinder assembly 41, a driving plate 43, a supporting plate 45; a welding assembly 47, a plurality of pressing assemblies 48, and a plurality of cutting assemblies 49 connected to the cylinder assembly 41. The welding mechanism 40 can be installed on the third supporting element 15. The cylinder assembly 41 can include a first air cylinder 411, a second air cylinder 413, a third air cylinder 415, and a fourth air cylinder 417. The first air cylinder 411 can be installed on the third supporting element 15, and the driving plate 43 can be fixed on the first air cylinder 411 thereby vertically moving with the first air cylinder 411. The supporting plate 45 can be positioned on the driving plate 43 thereby moving with the driving plate 43. The supporting plate 45 further include a holding plate 451, and the pressing assembly 48 and cutting assembly 49 can be positioned on the holding plate 451. The welding assembly 47 can be configured to weld the first feeding belt 200 and second feeding belt 300 (as shown in FIGS. 1-2), and the pressing assembly 48 can be configured to flatten the welded belts. The second air cylinder 413 can be installed on the supporting plate 45 and connected to the holding plate 451, to push the holding plate 451, the welding assembly 47, and the pressing assembly 48 positioned on the holding plate 451 to move horizontally with the second air cylinder 413.

The cutting assembly 49 can be positioned on the supporting plate 45 and adjacent to the welding assembly 47. The third air cylinder 415 can be located on a side of the cutting assembly 49 facing the welding assembly 47, to push the cutting assembly 49 to horizontally move to the welding assembly 47. The fourth air cylinder 417 can be installed on the driving plate 43 and under the cutting assembly 49, to push the cutting assembly 49 to vertically move to the welding assembly 47 and cut off superfluous parts of the belts.

After the belts are engaged by the pinning elements 3391 (as shown in FIG. 3), the cylinder assembly 41 can push the welding assembly 47 and the pressing assembly 48 to move to the positioning block 337 of the positioning assembly 33 which is furthest from the bracket 10 (as shown in FIG. 1), to weld the belts.

In welding, the first air cylinder 411 drives the driving plate 43 to move and welding assembly 47 can move to face and be square with the positioning assembly 33. Then, the second air cylinder 413 can push the welding assembly 47 to move to the positioning assembly 33 to weld the belts and transmit the welded belts after flattening by the pressing assembly 48, to the next manufacturing process. After a welding of the belts, the second air cylinder 413 can reset the welding assembly 47 and the pressing assembly 48. The second air cylinder 413 can push the cutting assembly 49 downward towards the welding assembly 47, and the fourth air cylinder 417 can push the cutting assembly 49 toward the welding assembly 47 to cut off superfluous parts of the welded belts.

After the welding of the belts farthest from the bracket 10 (as shown in FIG. 1), the feeding assembly 23 between the other two can transmit the belts to the middle positioning assembly 33, and the cylinder assembly 41 can push the welding assembly 47 to the middle positioning assembly 33 to weld the belts.

After the welding of the belts transmitted by the feeding assembly 23 which is in the middle, the positioning assembly 33 nearest the bracket 10 can receive the belts from the feeding assembly 23 nearest the bracket 10 (as shown in FIG. 1). The cylinder assembly 41 can push the welding assembly 47 to the positioning assembly 33 nearest the bracket 10 to weld the belts (as shown in FIG. 1).

When welding of the belts of each feeding assembly 23 of the feeding mechanism 20 is completed, a welding process is finished and a plurality of belts can be continuously added or incorporated to be welded in a next welding process.

As the welding device 100 can include a control unit 50 and a feeding mechanism 20, a positioning mechanism 30, a welding mechanism 40 controlled by the control unit 50 (as shown in FIG. 1), the welding device 100 can improve the efficiency and reduce the labor cost of the manufacturing process.

The embodiments shown and described above are only examples. Many details are often found in the art such as the other features of a welding device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A welding device for welding and transmitting belts, the welding device comprising:
    a feeding mechanism configured to store and transmit the belts;
    a positioning mechanism configured to receive the belts from the feeding mechanism and position the belts;
    a welding mechanism including a cylinder assembly and a welding assembly connected to the cylinder assembly configured to be driven by the cylinder assembly in a vertical direction and in a horizontal direction, whereby the welding assembly horizontally and vertically moved to the positioning mechanism; and
    a control unit configured to control an operation of the feeding mechanism, the positioning mechanism, and the welding mechanism.

2. The welding device as claimed in claim 1, wherein, the welding device further includes a bracket, and the bracket includes three supporting elements to house and support the feeding mechanism, the positioning mechanism, and the welding mechanism; and the three supporting elements includes:
    a first supporting element configured to install the feeding mechanism;
    a second supporting element configured to install the positioning mechanism; and
    a third supporting element configured to install the welding mechanism.

3. The welding device as claimed in claim 2, wherein, the feeding mechanism includes:
    a fixing column positioned on the first supporting element; and
    three feeding assemblies positioned on the fixing column vertically staggered.

4. The welding device as claimed in claim 2, wherein, the welding mechanism includes:
    a cylinder assembly positioned on the third supporting element;
    a driving plate positioned on the cylinder assembly;
    a supporting plate positioned on the driving plate, wherein the supporting plate includes a holding plate;
    a welding assembly positioned on the holding plate; and
    a plurality of cutting assemblies positioned on the holding plate and adjacent to a side of welding assembly.

5. The welding device as claimed in claim 2, wherein, the control unit includes:
    an electric control module positioned on the bracket configured to control the feeding mechanism, the positioning mechanism, and the welding mechanism; and
    a control panel positioned on the first supporting element and electrically connected to the electric control module.

6. The welding device as claimed in claim 3, wherein, the feeding assembly includes:
    a supporting element positioned on the fixing column;
    a first disk and a second disk positioned on two sides of the supporting element spaced apart from each other;
    a first driver positioned under the first disk and configured to drive the first disk to rotate;
    a second driver positioned under the second disk and configured to drive the second disk to rotate; and
    a guiding element adjacent to the first disk to adjust the motion of the belts.

7. The welding device as claimed in claim 6, wherein, the positioning mechanism includes:
    a fixing plate positioned on the second supporting element; and
    three positioning assemblies positioned on the fixing plate spaced apart from each other,
    wherein, each positioning assembly can be coplanar with each feeding assembly.

8. The welding device as claimed in claim 7, wherein, the feeding assembly includes:
    an assembly plate positioned on the fixing plate;
    a supporting block positioned on the assembly plate;
    a positioning element positioned on the supporting block facing the guiding element;
    a positioning block positioned on the assembly plate adjacent to the supporting block; and
    a pushing element positioned under the positioning block.

9. The welding device as claimed in claim 8, wherein, the pushing element includes three pinning elements configured to mesh with and engage the belts.

10. The welding device as claimed in claim 4, wherein, the welding mechanism further includes a plurality of pressing assemblies positioned on the holding plate and adjacent to the welding assembly to press the belts.

11. The welding device as claimed in claim 5, wherein, the cylinder assembly includes:
    a first air cylinder positioned on the first supporting element, wherein the driving plate is positioned on the first air cylinder;
    a second air cylinder positioned on the supporting plate and communicate with the holding plate;
    a third air cylinder positioned adjacent to a side of the cutting assembly facing the welding assembly; and
    a fourth air cylinder positioned on the driving plate and under the cutting assembly.

* * * * *